(12) United States Patent
Matsuike

(10) Patent No.: US 9,864,924 B2
(45) Date of Patent: Jan. 9, 2018

(54) IMAGE PROCESSING DEVICE, IMAGE PROCESSING METHOD, AND PROGRAM

(71) Applicant: Sony Interactive Entertainment Inc., Tokyo (JP)

(72) Inventor: Hiroshi Matsuike, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/221,852

(22) Filed: Jul. 28, 2016

(65) Prior Publication Data

US 2017/0061233 A1 Mar. 2, 2017

(30) Foreign Application Priority Data

Aug. 26, 2015 (JP) ................... 2015-167197

(51) Int. Cl.
*G06K 9/46* (2006.01)
*G06T 7/00* (2017.01)
*G06T 7/20* (2017.01)

(52) U.S. Cl.
CPC .......... *G06K 9/4638* (2013.01); *G06T 7/0044* (2013.01); *G06T 7/204* (2013.01)

(58) Field of Classification Search
CPC ...... G06K 9/4638; G06T 7/0044; G06T 7/204
See application file for complete search history.

(56) References Cited

U.S. PATENT DOCUMENTS

2006/0165275 A1* 7/2006 Horita ................ G01B 11/2522
382/152

FOREIGN PATENT DOCUMENTS

| JP | 2008-083779 A | 4/2008 |
|---|---|---|
| JP | 2009-514059 A | 4/2009 |
| JP | 2011-526389 A | 10/2011 |
| WO | WO 2007/002494 A2 | 1/2007 |
| WO | WO 2009/158466 A1 | 12/2009 |

OTHER PUBLICATIONS

KJ Kim; "Torus and simple surface intersection based on a configuration space approach"; 1998; bh.knu.ac.kr.*

(Continued)

*Primary Examiner* — Stephen R Koziol
*Assistant Examiner* — Shaghayegh Azima
(74) *Attorney, Agent, or Firm* — Katten Muchin Rosenman LLP

(57) ABSTRACT

An image processing device includes an inscribed sphere acquiring section that acquires an inscribed sphere which intersects line segment and is inscribed in torus in calculation of an intersection of the torus and a line segment, a calculating section that calculates an intersection of the inscribed sphere and the line segment, a reacquiring section that acquires the position of a new inscribed sphere in such a manner that a contact circle between the new inscribed sphere and the torus gets closer to the intersection, a recalculating section that calculates an intersection of the new inscribed sphere and the line segment, and an intersection output section that outputs the intersection of the torus and the line segment on the basis of an intersection of the inscribed sphere and the line segment obtained by at least one time of calculation of the intersection of the new inscribed sphere and the line segment.

6 Claims, 12 Drawing Sheets

(56) References Cited

OTHER PUBLICATIONS

Japanese Office Action dated Aug. 29, 2017 for the Corresponding Japanese Patent Application No. 2015-167197.
Akira Koriyama and three others, Introduction to Ray Tracing Using Java, Morikita Publishing, May 30, 2005, First Edition, pp. 120-137.

* cited by examiner

IMAGE PROCESSING DEVICE, IMAGE PROCESSING METHOD, AND PROGRAM

BACKGROUND

The present disclosure relates to an image processing device, an image processing method, and a program.

There is a case in which a position at which a sphere collides with another object is desired to be obtained. In order to obtain this position, the position at which a virtual object obtained by expanding the outer shape of the other object by the radius of the sphere intersects a line segment indicating the locus of the central point of the moving sphere is obtained and this position is output as the position of the center of the sphere in the case in which the sphere collides with the other object.

SUMMARY

For example, in the case of obtaining a position at which a circular column collides with a sphere, the shape obtained by expanding the circular column by the radius of the sphere is a shape obtained by combining a circular column having a larger diameter than the original circular column, a circular disc, and a torus. Methods for calculating the point at which the circular column or the circular disc intersects the line segment are known. On the other hand, obtaining the point at which the torus intersects the line segment is not realistic because involving solving a high-order equation that is difficult to analytically solve.

There is a need for the present disclosure to provide a realistic technique that can obtain a point at which a torus intersects a line segment.

According to an embodiment of the present disclosure, there is provided an image processing device including an inscribed sphere acquiring section configured to acquire an inscribed sphere that intersects a line segment and is inscribed in a torus in calculation of an intersection of the torus and the line segment, a calculating section configured to calculate an intersection at which the inscribed sphere intersects the line segment, a reacquiring section configured to acquire a position of a new inscribed sphere in such a manner that a contact circle that is a contact position between the new inscribed sphere and the torus gets closer to the intersection, a recalculating section configured to calculate an intersection of the new inscribed sphere and the line segment, and an intersection output section configured to output the intersection of the torus and the line segment on the basis of an intersection of the inscribed sphere and the line segment obtained by causing the recalculating section to calculate the intersection of the new inscribed sphere acquired by the reacquiring section and the line segment one time or a plurality of times.

According to another embodiment of the present disclosure, there is provided an image processing method including acquiring an inscribed sphere that intersects a line segment and is inscribed in a torus in calculation of an intersection of the torus and the line segment, calculating an intersection at which the inscribed sphere intersects the line segment, acquiring a position of a new inscribed sphere in such a manner that a contact circle that is a contact position between the new inscribed sphere and the torus gets closer to the intersection, calculating an intersection of the new inscribed sphere and the line segment, and outputting the intersection of the torus and the line segment on the basis of an intersection of the inscribed sphere and the line segment obtained by calculating the intersection of the new inscribed sphere acquired and the line segment one time or a plurality of times.

According to another embodiment of the present disclosure, there is provided a program for a computer including by an inscribed sphere acquiring section, acquiring an inscribed sphere that intersects a line segment and is inscribed in a torus in calculation of an intersection of the torus and the line segment, by a calculating section, calculating an intersection at which the inscribed sphere intersects the line segment, by a reacquiring section, acquiring a position of a new inscribed sphere in such a manner that a contact circle that is a contact position between the new inscribed sphere and the torus gets closer to the intersection, by a recalculating section, calculating an intersection of the new inscribed sphere and the line segment, and by an intersection output section, outputting the intersection of the torus and the line segment on the basis of an intersection of the inscribed sphere and the line segment obtained by causing the recalculating section to calculate the intersection of the new inscribed sphere acquired by the reacquiring section and the line segment one time or a plurality of times.

Furthermore, a computer-readable information storage medium according to an embodiment of the present disclosure stores the above-described program.

According to the embodiment of the present disclosure, the point at which the torus intersects the line segment can be easily obtained.

DETAILED DESCRIPTION OF THE PREFERRED EMBODIMENT

An embodiment of the present disclosure will be described below according to the drawings. Elements having the same function among constituent elements that appear are given the same symbol and description thereof is omitted.

Figure 1:
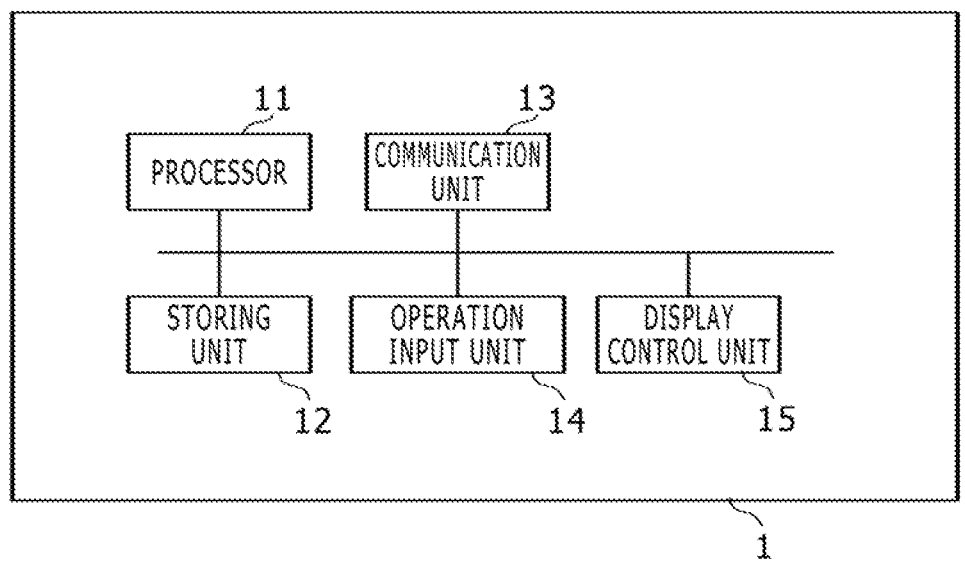
FIG. 1 is a diagram depicting one example of a hardware configuration of an image processing device according to an embodiment of the present disclosure.

FIG. 1 is a diagram depicting one example of a hardware configuration of an image processing device 1 according to the embodiment of the present disclosure. The image processing device 1 is a personal computer, game machine for home use, or a portable information terminal. The image processing device 1 includes a processor 11, a storing unit 12, a communication unit 13, an operation input unit 14, and a display control unit 15.

The processor 11 operates in accordance with a program stored in the storing unit 12 and controls the communication unit 13, the operation input unit 14, the display control unit 15, and so forth. The above-described program may be stored in a computer-readable storage medium such as a flash memory co be provided or may be provided via a network such as the Internet.

The storing unit 12 is formed of a memory element such as a dynamic random access memory (DRAM) or a flash memory. The storing unit 12 stores the above-described program. Furthermore, the storing unit 12 stores information and an results input from the processor 11, the communication unit 13, and so forth.

The communication unit 13 is formed of an integrated circuit, a connector, an antenna, and so forth that configure a wired local area network (LAN) or a wireless LAN. The communication unit 13 has a function of communicating with another device via a network. On the basis of control by the processor 11, the communication unit 13 inputs information received from the other device to the processor 11 and the storing unit 12 and transmits information to the other device.

The operation input unit 14 is a circuit that acquires input from hardware that detects operation by a user. The operation input unit 14 acquires input from a touch panel, a controller, a keyboard, etc. for example, and inputs detected information to the processor 11 and the storing unit 17.

The display control unit 15 includes a circuit that controls a display output device such as a display. The display control unit 15 causes the display output device to display an image on the basis of control by the processor 11.

Figure 2:
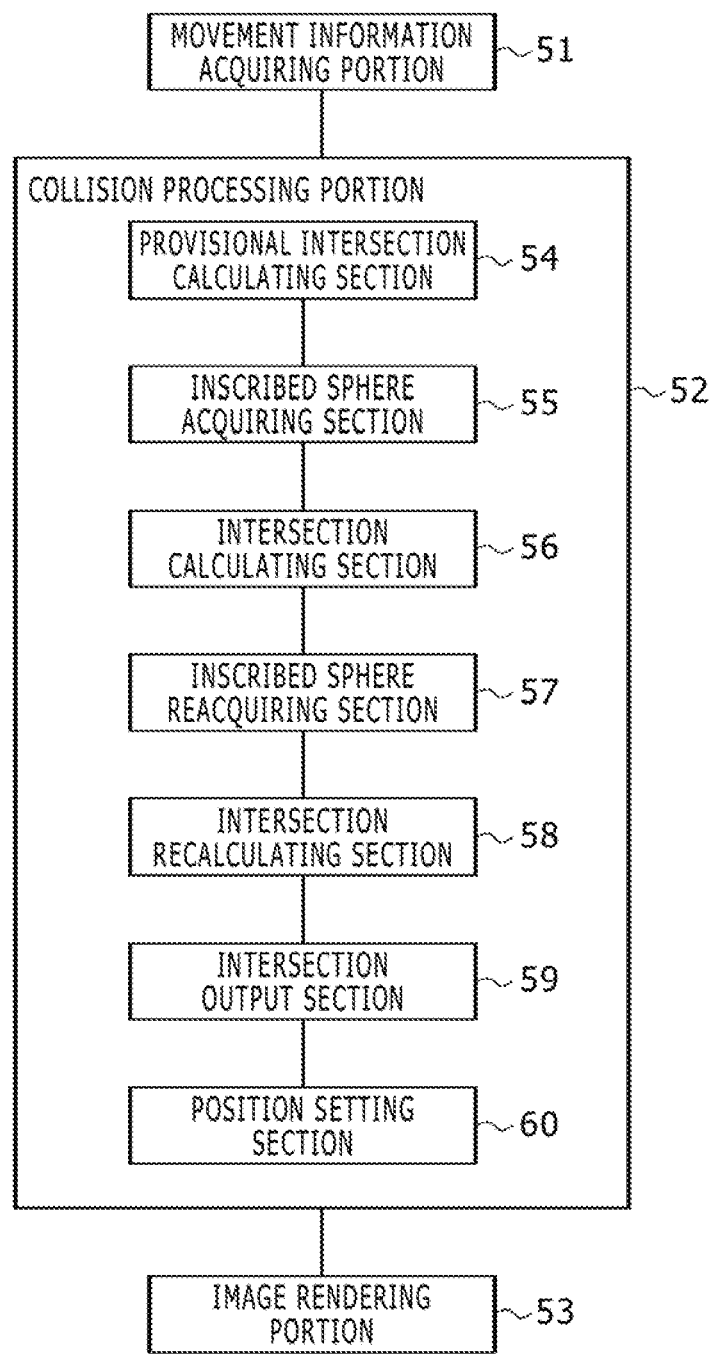
FIG. 2 is a block diagram depicting functions implemented by the image processing device.

FIG. 2 is a block diagram depicting functions implemented by the image processing device 1 according to the embodiment of the present disclosure. The image processing device 1 functionally includes a movement information acquiring portion 51, a collision processing portion 52, and an image rendering portion 53. Furthermore, the collision processing portion 52 includes a provisional intersection calculating section 54, an inscribed sphere acquiring section 55, an intersection calculating section 56, an inscribed sphere reacquiring section 57, an intersection recalculating section 58, an intersection output section 59, and a position setting section 60. These sections are implemented through execution of a program stored in the storing unit 12 and control of the operation input unit 14, the display control unit 15, and so forth by the processor 11.

The movement information acquiring portion 51 is implemented based mainly on the processor 11 and the storing unit 12. The movement information acquiring portion 51 acquires information indicating the direction and amount of movement in a virtual space regarding objects configuring an image of three-dimensional computer graphics. The information indicating the direction and amount of the movement of the object may be a velocity vector of the object or may be a vector indicating the movement amount and the direction in the period from the previous frame to the present frame rendered this time. Furthermore, the movement information acquiring portion 51 may acquire the information indicating the direction and amount of the movement of the object on the basis of information that is stored in the storing unit 12 and relates to the operation of this object, or may acquire the information indicating the direction and amount of the movement of the object on the basis of operation by a user input from the operation input unit 14.

The collision processing portion 52 is implemented based mainly on the processor 11 and the storing unit 12. The collision processing portion 52 determines whether or not plural objects collide with each other. Furthermore, regarding objects that collide with each other, the collision processing portion 52 outputs the collision position thereof. Then, the collision processing portion 52 decides the position of each of the plural objects in the present frame on the basis of whether or not objects collide and the collision position when objects collide.

The image rendering portion 53 is implemented based mainly on the processor 11, the storing unit 12, and the display control unit 15. The image rendering portion 53 renders the plural objects on the basis of the positions of these plural objects in the virtual space decided by the collision processing portion 52, and causes the display output device to display an image in which the objects are rendered.

Figure 3:
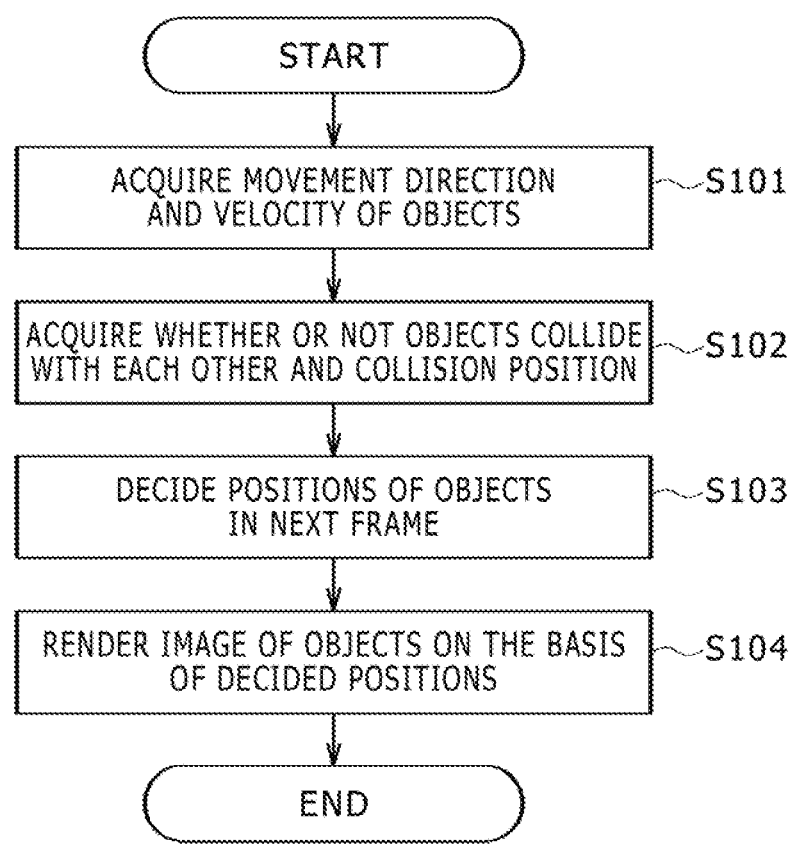
FIG. 3 is a diagram depicting one example of a processing flow of the image processing device.

FIG. 3 is a diagram depicting one example of a processing flow of the image processing device 1. The processing depicted in FIG. 3 is repeatedly carried out every time an image of a frame including plural objects is rendered.

First, the movement information acquiring portion 51 acquires information indicating the movement direction and velocity of each of the plural objects (step S101). Next, the collision processing portion 52 acquires whether or not the plural objects collide with each other and the collision position of objects that collide with each other (step S102).

Furthermore, the position setting section 60 included in the collision processing portion 52 decides the positions of the plural objects in the next frame (step S103). Specifically, if an object as a target of the position decision (target object) does not collide with another object, the position setting section 60 deems that the target object moves with the movement direction and the movement amount indicated by the information acquired by the movement information acquiring portion 51, and decides the position of the target object. If the target object collides with another object, the position setting section 60 deems that the target object moves to the collision position and decides the position of the target object. Alternatively, the position setting section 60 calculates the direction of bounce from the collision position and the movement amount and decides the position indicated by the calculated bounce direction and movement amount as the position of the target object.

Then, the image rendering portion 53 renders an image of the plural objects on the basis of the decided positions of these plural objects, and causes the display output device to display the rendered image (step S104).

Next, a description will be made about processing of acquiring whether or not plural objects collide with each other and the collision position of objects that collide with each other. This processing corresponds to particularly the step S102 of the collision processing portion 52. Here, a description will be made particularly about processing when two objects as the target of the collision detection are a sphere and a circular column (cylinder). Collision between a sphere and a sphere, collision between a sphere and a capsule, and collision between a sphere and a box can be detected by publicly-known methods and therefore description thereof is omitted.

Figure 4:
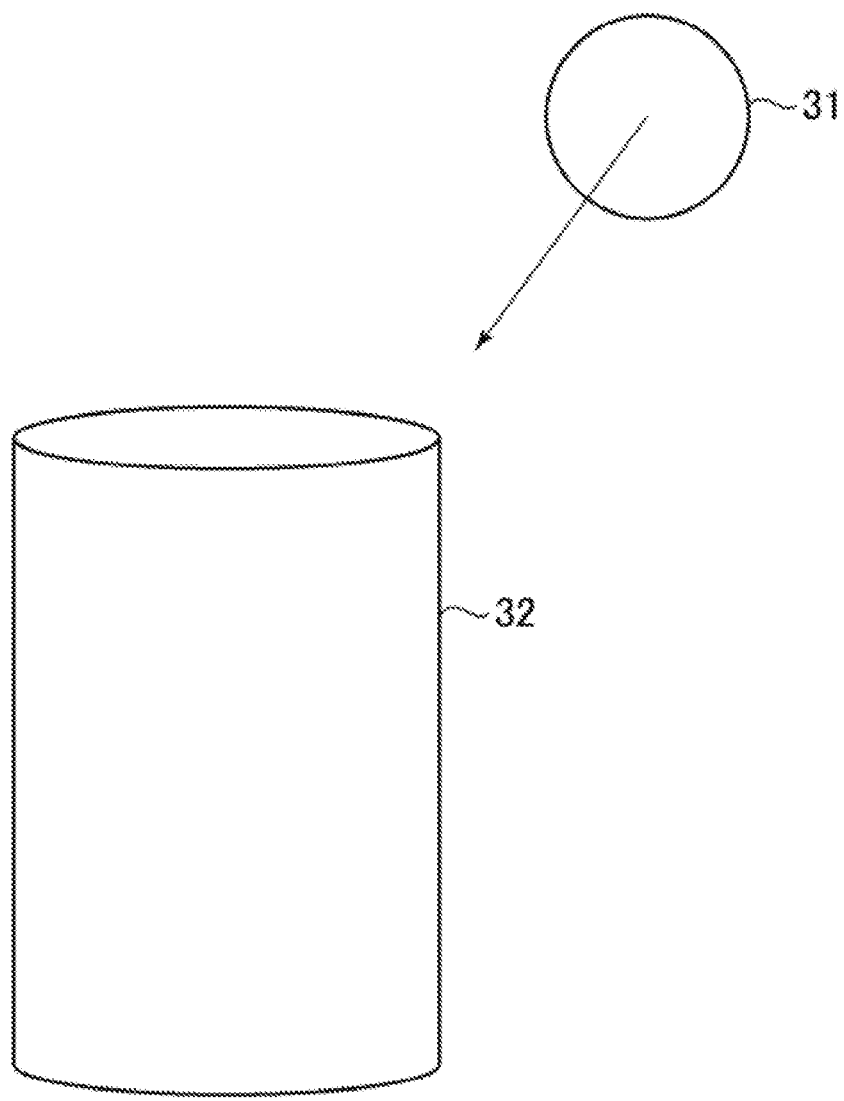
FIG. 4 is a diagram depicting one example of a target sphere and a target circular column as a target of collision determination.

FIG. 4 is a diagram depicting one example of a target sphere 31 and a target circular column 32 as the target of collision determination. The target sphere 31 and the target circular column 32 are a sphere and a circular column, respectively, as the target of collision detection. In the following description, it is assumed that the target circular column 32 is still. However, even when the target circular column 32 is moving, collision can be detected by a similar method if the relative movement direction and movement amount of the target sphere 31 obtained from the relative velocity of the target sphere 31 with respect to the target circular column 32 are used instead of the mere movement direction and movement amount of the target sphere 31.

Figure 5:
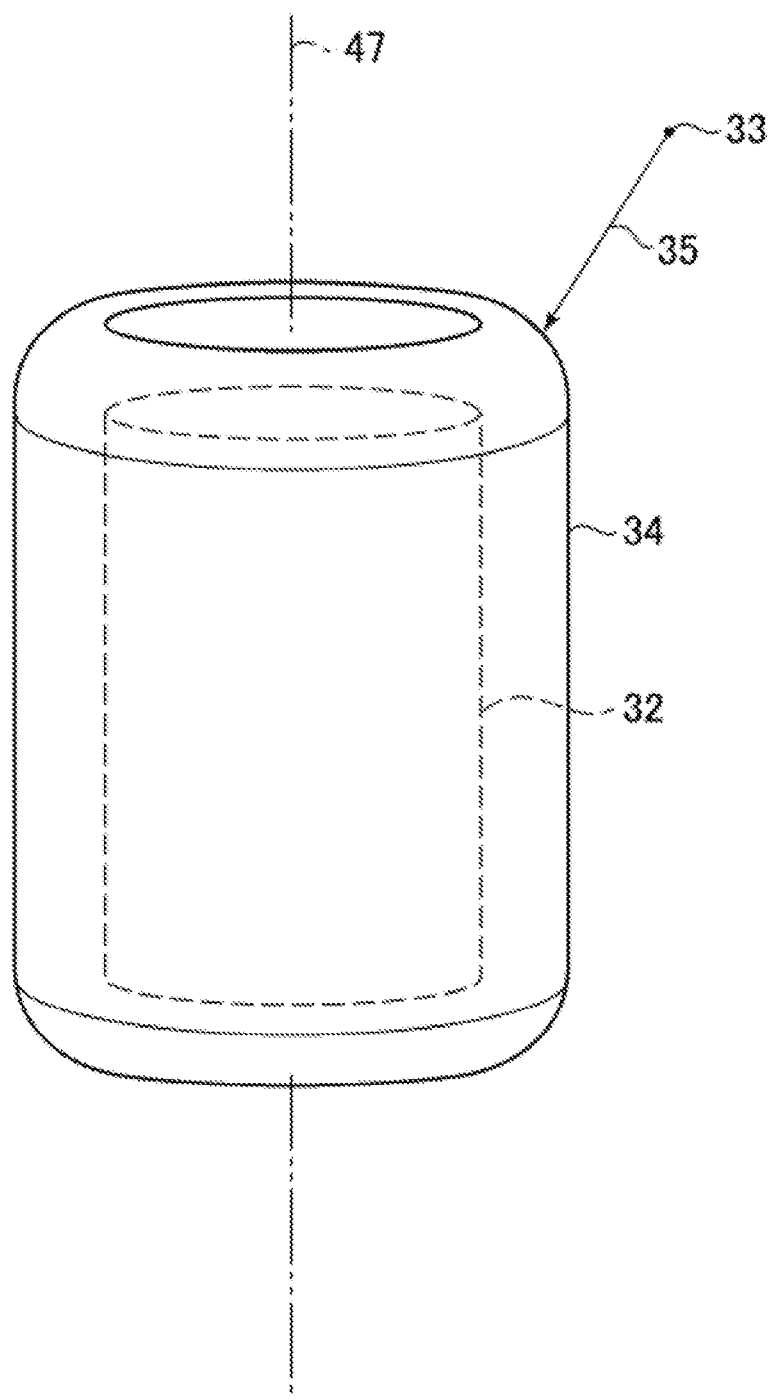
FIG. 5 is a diagram depicting one example of an expanded object and a locus used for the collision determination.

FIG. 5 is a diagram depicting one example of an expanded object 34 and a start point 33 used for the collision determination. The surface of the expanded object 34 is a surface whose distance from the surface of the target circular column 32 is the radius of the target sphere 31, and the surface of the expanded object 34 exists outside the target circular column 32. Furthermore, the center of the target sphere 31 in the previous frame is the start point 33 of line segment 35, and an end point of the line segment 35 exists at a position separate from the start point 33 in the movement direction of the target sphere 31 by the movement amount. The expanded object 34 axisymmetric, with a central axis 47 being the symmetrical axis. The following description will be made based on the assumption that the direction of the central axis 47 is the vertical direction for easy explanation.

That an intersection of the expanded object 34 and the line segment 35 exists is equivalent to that the target circular column 32 collides with the target sphere 31. Furthermore, the intersection of the expanded object 34 and the line segment 35 is equivalent to the position of the center of the target sphere 31 when the target circular column 32 collides with the target sphere 31. In the present embodiment, the collision processing portion 52 obtains whether or not the target circular column 32 collides with the target sphere 31 and the collision position when the target sphere 31 collides with the target circular column 32 by searching for the intersection of the expanded object 34 and the line segment 35.

Figure 6:
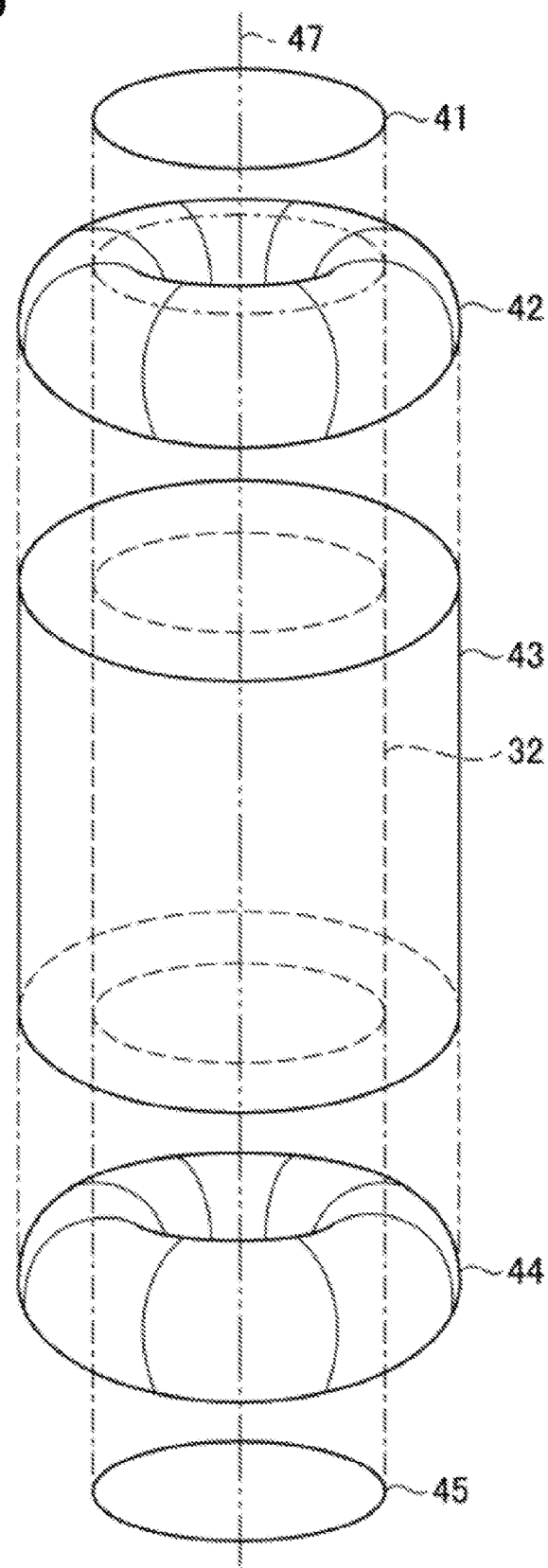
FIG. 6 is a diagram depicting elements configuring the expanded object.

FIG. 6 is a diagram cling elements configuring the expanded object 34. FIG. 6 is an exploded view of the elements configuring the expanded object 34. The surface of the expanded object 34 is expressed by combining, from the upper side in FIG. 6 sequentially, the surfaces of a circular disc 41, a torus 42, an extended circular column 43, a torus 44, and a circular disc 45. The extended circular column 43 is a circular column obtained by increasing the radius of the target circular column 32 by the radius of the target sphere 31, and the height of the extended circular column 43 is the same as the height of the target circular column 32. When the radius of the target circular column 32 is defined as R and the radius of the target sphere 31 is defined as r, the radius of the extended circular column 43 is R+r and the symmetrical axis of the target circular column 32 (central axis 47) overlaps with the symmetrical axis of the extended circular column 43.

The tori 42 and 44 each have a ring-shaped tube. The collection of the centers of sections of the tube of the torus 42 is the circumference of the circular disc forming the upper end of the target circular column 32. The collection of the centers of sections of the tube of the torus 44 is the circumference of the circular disc forming the lower end of the target circular column 32. The tori 42 and 44 are axisymmetric. The symmetrical axes of the tori 42 and 44 exist at the center of the rings and overlap with the central axis 47. The sections of the tori 42 and 44 cut by a plane passing through the axis have a circle that is centered at a point whose distance from the central axis 47 is R and has a radius r. When the tori 42 and 44 are divided into the upper half and the lower half in the axial direction, the lower half of the torus 42 and the upper half of the torus 44 overlap with the extended circular column 43. In FIG. 6, circles of sections that divide the tori 42 and 44 into eight segments are depicted by lines for facilitation of recognition of the shape.

The circular disc 41 is a region on a flat plane surrounded by a circle made by linking the highest part of the torus 42, and the circular disc 45 is a region on a flat plane surrounded by a circle made by linking the lowest part of the torus 44. The centers of the circular discs 41 and 45 exist on the central 47 and the radius thereof is (R), which is the same as the radius of the target circular column 32.

The processing of searching for the intersection of the expanded object 34 and the line segment 35 is executed by the provisional intersection calculating section 54, the inscribed sphere acquiring section 55, the intersection calculating section 56, the inscribed sphere reacquiring section 57, the intersection recalculating section 58, and the intersection output section 59, which are included in the collision processing portion 52.

The provisional intersection calculating section 54 obtains an intersection (provisional intersection P0) of a provisional circular column 48 circumscribed to the expanded object 34 and the line segment 35. The provisional circular column 48 surrounds the tori 42 and 44. Furthermore, the provisional intersection calculating section 54 determines whether the provisional intersection P0 of the provisional circular column 48 and the line segment 35 exists in a region involving determination of intersecting with the torus 42 or 44. If the provisional intersection P0 exists in the region involving determination of intersecting with the torus 42 or 44, the inscribed sphere acquiring section 55 acquires one or plural inscribed spheres B inscribed in the torus 42 or 44 on the basis of the provisional intersection P0 of the provisional circular column 48 and the line segment 35. Hereinafter, the inscribed sphere B will refer to any inscribed sphere acquired by the inscribed sphere acquiring section 55 or the inscribed sphere reacquiring section 57. However, the inscribed sphere B will be described as an inscribed sphere B1, B2, or the like if it is possible to specifically identify which inscribed sphere the inscribed sphere B is. In most of the cases in which the line segment 35 intersects the torus 42 or 44, this inscribed sphere B intersects the line segment 35.

The intersection calculating section 56 calculates an intersection P at which the inscribed sphere B intersects the line segment 35. The inscribed sphere reacquiring section 57 acquires the position of a new inscribed sphere B in such a manner that a contact circle as the contact position between the new inscribed sphere B and the torus 42 or 44 gets closer to the calculated intersection P. The intersection recalculating section 58 calculates the intersection P between the new inscribed sphere B and the line segment 35. The intersection output section 59 outputs the intersection of the torus 42 or 44 and the line segment 35 on the basis of the intersection P of the inscribed sphere B and the line segment 35 obtained by causing the intersection recalculating section 58 to calculate the intersection of the new inscribed sphere B acquired by the inscribed sphere reacquiring section 57 and the line segment 35 one time or plural times.

Figure 7:
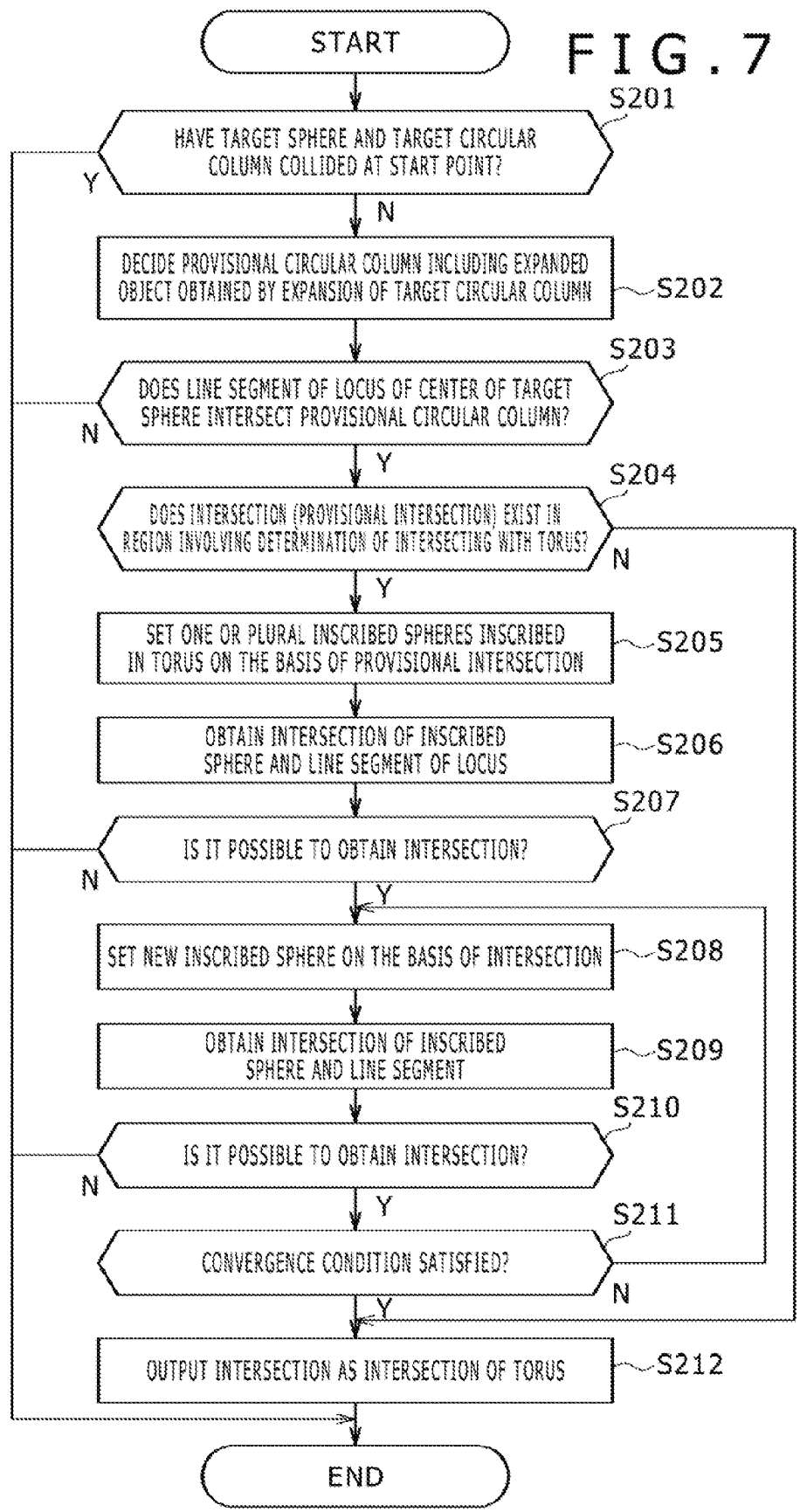
FIG. 7 is a diagram depicting one example of a processing flow of a collision processing portion regarding detection of collision between a sphere and a circular column.

Next, details of the processing of the step S102 will be described. FIG. 7 is a diagram depicting one example of a processing flow of the collision processing portion 52 regarding detection of collision between a sphere and a circular column. First, the collision processing portion 52 determines whether the target sphere 31 and the target circular column 32 have collided at the start point 33 (step S201). Specifically, the collision processing portion 52 determines whether or not the point of the center of the target sphere 31 in the previous frame (start point 33) exists in the target circular column 32, and determines that the target sphere 31 and the target circular column 32 have already collided if the start point 33 exists in the target circular column 32. If it is determined that the target sphere 31 and the target circular column 32 have collided (Y of the step S201), the intersection output section 59 of the collision processing portion 52 outputs information indicating that it is determined that collision has occurred and information indicating that it is difficult to detect the collision position, followed by proceeding to the processing of the step S103.

If it is determined that the target sphere 31 and the target circular column 32 have not collided (N of the step S201), processing of a step S202 and subsequent steps is executed in order to obtain the intersection of the line segment 35, which is the locus of the central point of the target sphere 31 when the target sphere 31 is moved with the movement direction and movement amount acquired in the step S101 from the previous frame, and the expanded object 34, which has a shape obtained by the expansion of the target circular column 32.

Figure 8:
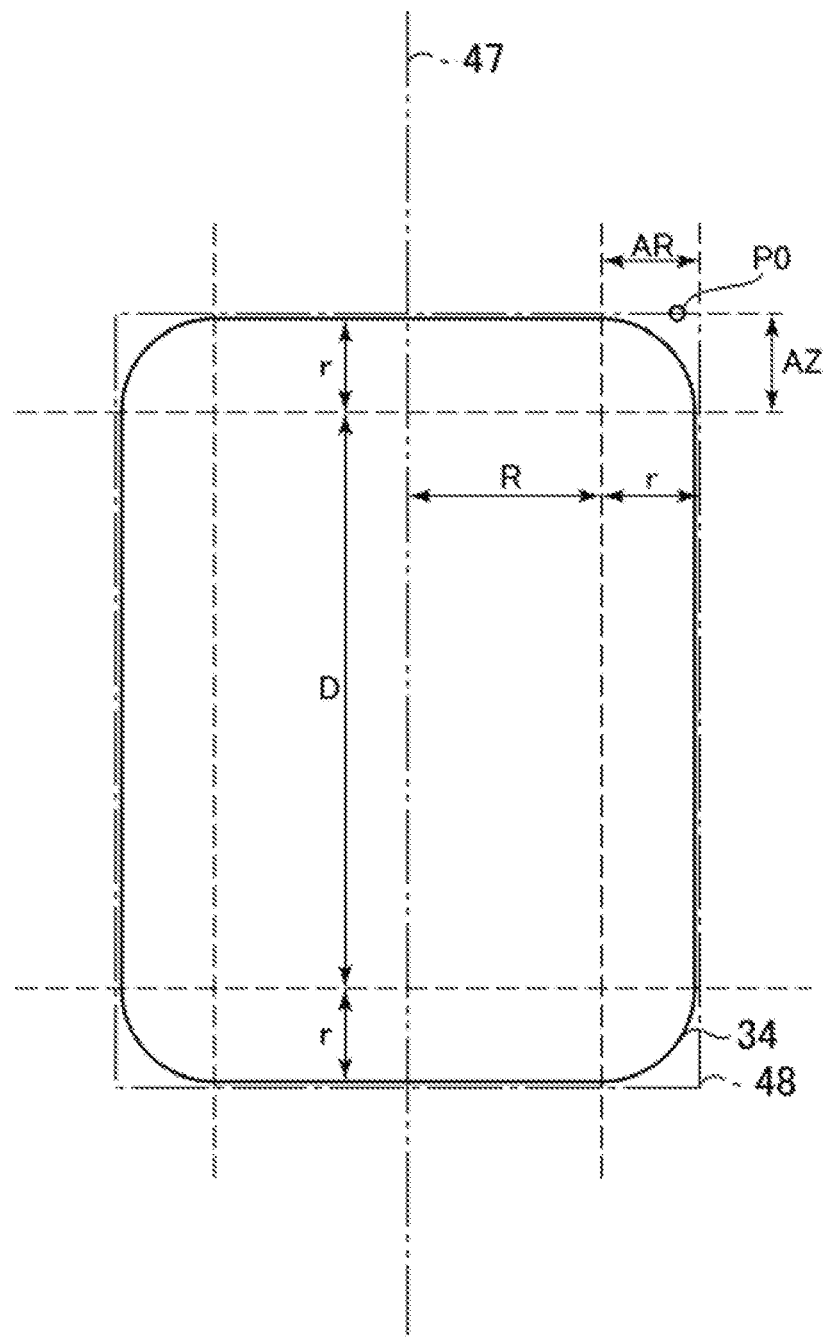
FIG. 8 is a sectional view passing through a central axis of the expanded object.

In the step S202, the provisional intersection calculating section 54 decides the provisional circular column 48 including the expanded object 34 obtained by the expansion of the target circular column 32. FIG. 8 is a sectional view passing through the central axis 47 of the expanded object 34. In FIG. 8, the provisional circular column 48 is also depicted. The provisional intersection calculating section 54 decides the size and position of the provisional circular column 48 in such a manner that the provisional circular column 48 satisfies the following conditions: the symmetrical axis of the provisional circular column 48 is the central axis 47 of the expanded object 34; the radius is (R+r); the length in the direction of the central axis 47 is (D+2r); the side surface of the provisional circular column 48 is in contact with the extended circular column 43; and circular discs of the upper surface and lower surface of the provisional circular column 48 are in contact with the circular discs 41 and 45. D is the height of the target circular column 32 and R is the radius of the target circular column 32.

Next, the provisional intersection calculating section 54 determines whether the line segment 35 of the locus of the center of the target sphere 31 intersects the provisional circular column 48 (step S203). Specifically, the provisional intersection calculating section 54 acquires a point M obtained by projecting the start point 33 of the line segment 35 onto the central axis 47 and a point N obtained by projecting the start point 33 of the line segment 35 onto the flat plane including the circular disc of the upper surface of the provisional circular column 48. Here, it is assumed that the direction of the central axis 47 is the vertical direction. If the point M exists inside the provisional circular column 48, the provisional intersection calculating section 54 determines that the start point 33 exists in the Voronoi region of the side surface of the provisional circular column 48, and searches for the intersection of the side surface of the provisional circular column 48 and the line segment 35. If the point M exists above the provisional circular column 48 and the point N exists in the circular disc of the upper surface of the provisional circular column 48, the provisional intersection calculating section 54 determines that the start point 33 exists in the Voronoi region of the circle of the upper surface, and searches for the intersection of the upper surface of the provisional circular column 48 and the line segment 35. If the point M exists below the provisional circular column 48 and the point N exists in the circular disc of the upper surface of the provisional circular column 48, the provisional intersection calculating section 54 determines that the start point 33 exists in the Voronoi region of the circle of the lower surface, and searches for the intersection of the lower surface of the provisional circular column 48 and the line segment 35. If the point M exists above the provisional circular column 48 and the point N exists outside the circular disc of the upper surface of the provisional circular column 48, the provisional intersection calculating section 54 determines that the start point 33 exists in the Voronoi region of the circumference of the upper surface, and searches for the intersection of the upper surface of the provisional circular column 48 and the line segment 35 and the intersection of the side surface of the provisional circular column 48 and the line segment 35. If the intersection is not found by these kinds of processing, the provisional intersection calculating section 54 determines that the line segment 35 does not intersect the provisional circular column 48 and the target sphere 31 does not collide with the target circular column 32 (N of the step S203), followed by proceeding to the processing of the step S103. On the other hand, if the intersection of the line segment 35 and any of the side surface, upper surface, and lower surface of the provisional circular column 48 is found, the provisional intersection calculating section 54 determines that the line segment 35 intersects the provisional circular column 48 and the intersection is the provisional intersection P0 (Y of the step S203), followed by proceeding to the processing of a step S204.

In the step S204, the provisional intersection calculating section 54 determines whether or not the provisional intersection P0 exists in the region involving determination of intersecting with the torus 42 or 44. Specifically, the provisional intersection calculating section 54 determines that the provisional intersection P0 exists in the region involving determination of intersecting with the torus 42 or if distance L1 of the provisional intersection P0 from the central axis satisfies R<L1<(R+r) and distance L2 between a point obtained by projecting the provisional intersection P0 onto the central axis 47 and the lower end of the provisional circular column 48 satisfies 0<L2<r or D+r<L2<D+2r (for example if the provisional intersection P0 exists in a range AR and in a range AZ in FIG. 8) (Y of the step S204). Furthermore, if it is determined that the provisional intersection P0 exists in the region involving determination of intersecting, the provisional intersection calculating section 54 determines to carry out determination of intersecting with the torus 44 in the case of 0<L2<r, and determines to carry out determination of intersecting with the torus 42 in the case of D+r<L2<D+2r. On the other hand, if it is not determined that the provisional intersection P0 exists in the region involving determination of intersecting with the torus 42 or 44 (N of the step S204), the provisional intersection P0 exists above the circumference at the extended circular column 43 or above the circular discs 41 and 45, the provisional intersection P0 is directly employed as the intersection of the line segment 35 and the expanded object 34 and the position at which the target sphere 31 collides with the target circular column 32, followed by proceeding to the processing of the step S103.

If the provisional intersection P0 exists in the region involving determination of intersecting with the torus 42 or 44 (Y of the step S204), the inscribed sphere acquiring section 55 sets one or plural inscribed spheres B inscribed in the torus about which the determination of intersecting is to be carried out (hereinafter, described as the "determination torus T") in the tori 42 and 44 on the basis of the provisional intersection P0 (step S205).

Figure 9:
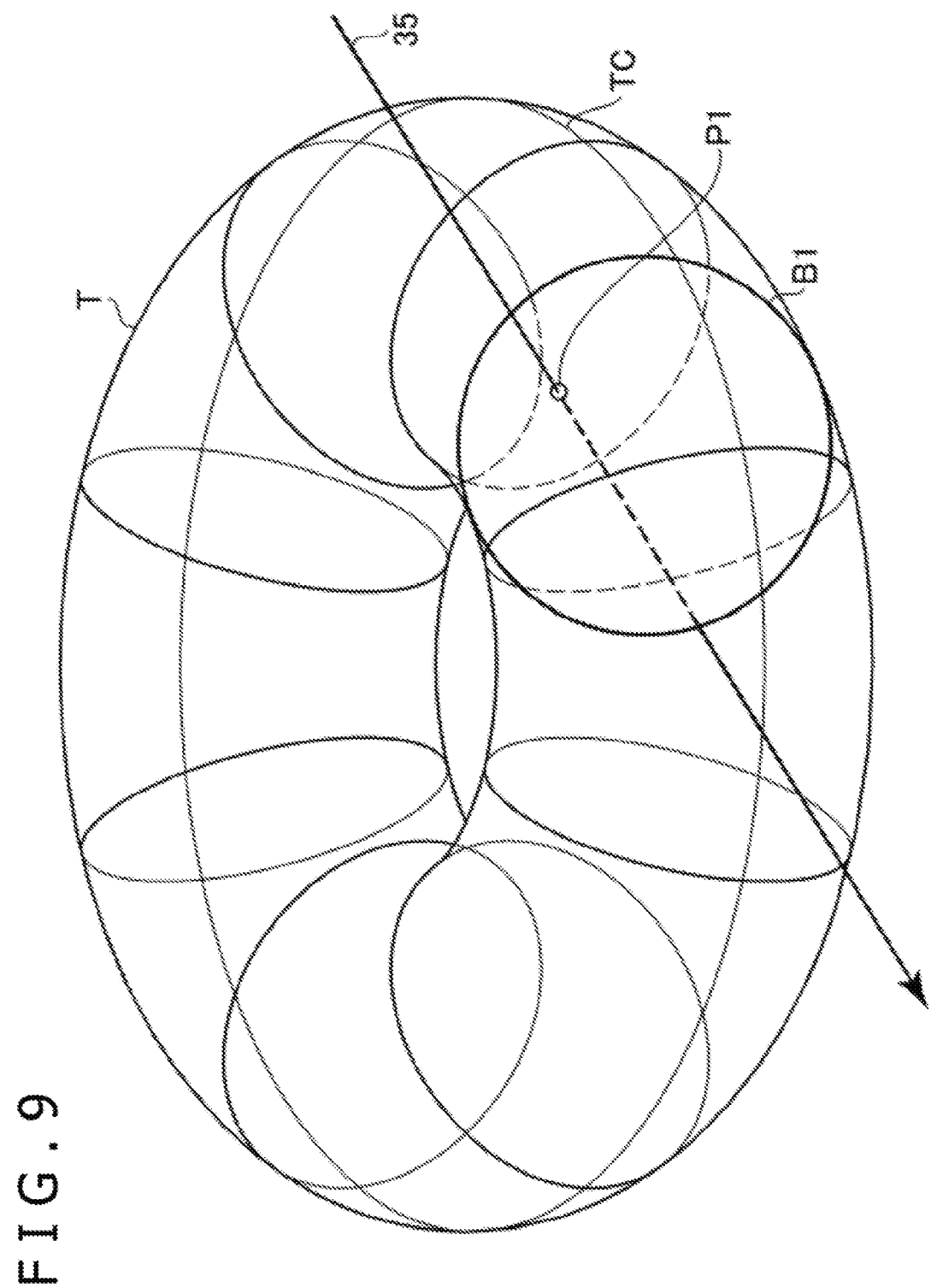
FIG. 9 is a diagram depicting one example of a sphere inscribed in a torus.

FIG. 9 is a diagram depicting one example of the inscribed sphere B1 inscribed in the determination torus T. In this diagram, for facilitation of recognition of the shape, circles of sections that divide the determination torus T into eight segments are depicted by lines and only lines hidden by the inscribed sphere B1 are depicted as dashed lines. The determination torus T is surrounded by the provisional circular column 48 although not depicted in the diagram. Furthermore, if the circle as the collection of the points remotest from the central axis 47 in the determination torus T is defined as an outer circumferential circle TC and the line linking the highest points and the line linking the lowest points when the direction of the determination torus T along the central axis 47 is defined as the vertical direction are defined as an upper end circle and a lower end circle, respectively, the outer circumferential circle TC and one of the upper end circle and the lower end circle are in contact with the provisional circular column 48.

Figure 10:
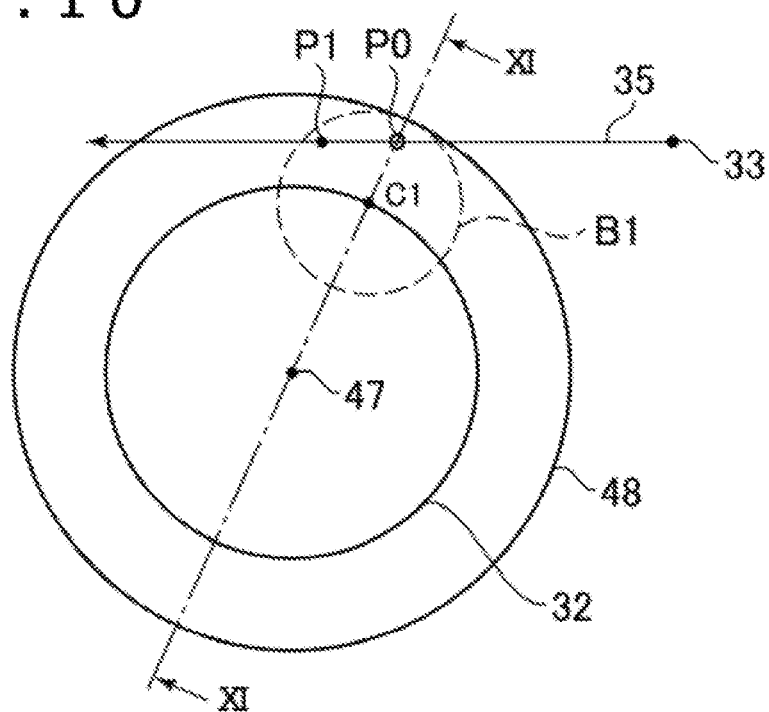
FIG. 10 is a diagram depicting one example of a provisional intersection of a provisional circular column and a line segment and an inscribed sphere.
Figure 11:
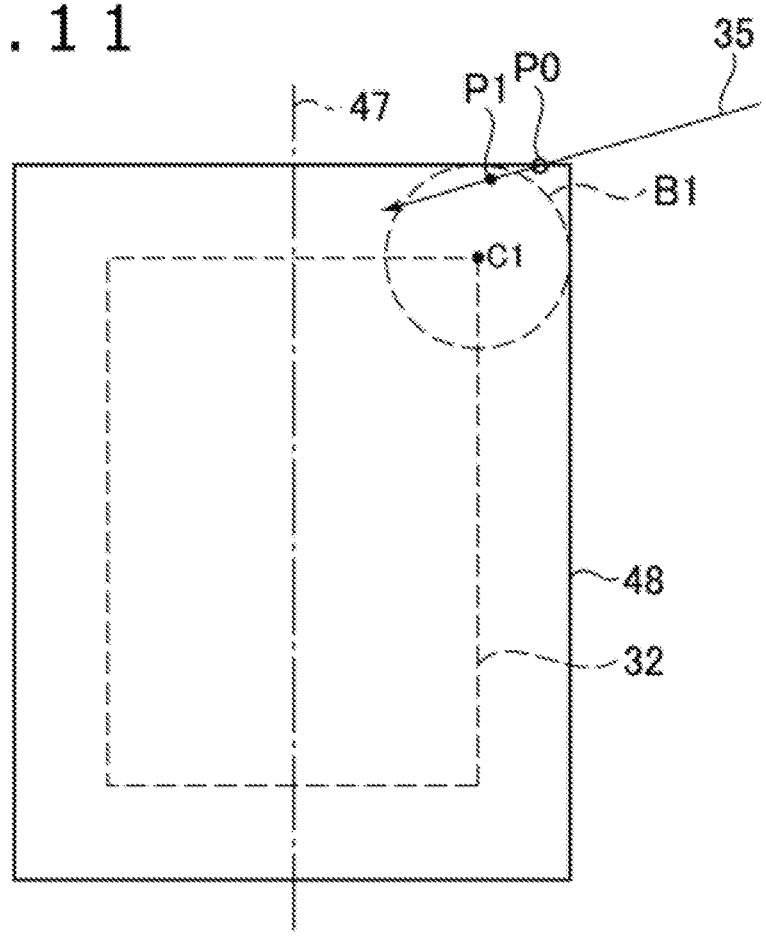
FIG. 11 is a sectional view along cutting line XI-XI in FIG. 10.

FIG. 10 is a diagram depicting one example of the provisional intersection P0 of the provisional circular column 48 and the line segment 35 and the inscribed sphere B1. FIG. 10 is a diagram obtained when the provisional circular column 48 and so forth are viewed from one side of the central axis 47. FIG. 11 is a sectional view along cutting line XI-XI in FIG. 10. FIGS. 10 and 11 depict one inscribed sphere B1 set in part of processing of obtaining the intersection at which the determination torus T intersects the line segment 35. In the example of FIG. 10, the inscribed sphere acquiring section 55 sets one inscribed sphere B1 in such a manner that a center C1 of the inscribed sphere B1 is located on the flat plane including the provisional intersection P0 and the central axis 47 and on the circumference of the circular disc closer to the provisional intersection P0 in the circular discs of the upper end and lower end of the target circular column 32 and the inscribed sphere B1 is inscribed in the determination torus T. If this is done, the collection of the positions at which the inscribed sphere B1 is in contact with the determination torus T is a circle existing on the flat plane including the provisional intersection P0 and the central axis 47. Hereinafter, this circle will be referred to as the contact circle. The contact circle is in contact with the circumference of the provisional circular column 48 and the circular disc of one of the upper and lower ends.

Figure 12:
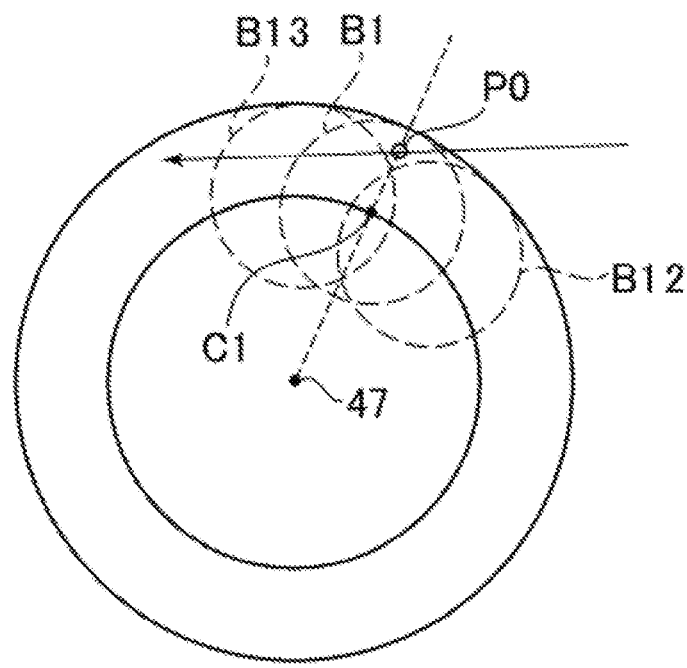
FIG. 12 is a diagram depicting one example of the provisional intersection of the provisional circular column and the line segment and plural inscribed spheres.

Although the number of inscribed spheres B acquired by the inscribed sphere acquiring section 55 is one in the example of FIGS. 9 to 11, the number of inscribed spheres B may be two or more. FIG. 12 is a diagram depicting one example of the provisional intersection P0 of the provisional circular column 48 and the line segment 35 and plural inscribed spheres B1, B12, and B13. The inscribed sphere B1 is set according to the provisional intersection P0 by the same method as the example of FIG. 10. In this case, the inscribed sphere acquiring section 55 acquires the inscribed spheres B12 and B13 disposed to be located adjacent to the inscribed sphere B1, besides the inscribed sphere B1. Furthermore, the inscribed sphere acquiring section 55 acquires the inscribed spheres B1, B12, and P13 in such a manner that each of the inscribed spheres B1, B12, and B13 overlaps with at least one of the other inscribed spheres B. This can reduce the occurrence of a phenomenon in which, in processing of the intersection calculating section 56 to be described later, it is determined that the determination torus T does not intersect the line segment 35 because the intersection P of the inscribed sphere B1 and the line segment 35 is not found although actually the determination torus T intersects the line segment 35.

Next, the intersection calculating section 56 obtains an intersection P1 of the one or plural inscribed spheres B and the line segment 35 of the locus (step S206). For example, the intersection calculating section 56 obtains the intersection P1 of the inscribed sphere B1 and the line segment 35 by solving a quadratic equation derived from an expression representing the inscribed sphere B1 and an expression representing the line segment 35. If two intersections of one inscribed sphere B1 and Le line segment 35 are obtained, the intersection calculating section 56 obtains the intersection P1 closest to the start point 33 of the line segment 35 as the target of the subsequent processing. In FIGS. 10 and 11, an example of the intersection P1 is depicted.

If plural intersections are obtained regarding the plural inscribed spheres B and the line segment 35, the intersection calculating section 56 obtains the intersection closest to the start point 33 among the intersections as the intersection P1 as the target of the subsequent processing. On the other hand, if the quadratic equation has no real roots and it is difficult to obtain the intersection P1 (N of a step S207), the intersection output section 59 outputs information indicating that it is determined that the intersection of the determination torus T and the line segment 35 does not exist and the target sphere 31 does not collide with the target circular column 32, followed by proceeding to the processing of the step S103.

If the quadratic equation has real roots and it is possible to obtain the intersection P1 (Y of the step S207), the inscribed sphere reacquiring section 57 acquires the new inscribed sphere B on the basis of the intersection P obtained most recently (step S208). At this time, the inscribed sphere reacquiring section 57 acquires the position of the new inscribed sphere B in such a manner that a contact circle as the contact position between the new inscribed sphere B and the determination torus T gets closer to the intersection P obtained most recently. The number of new inscribed spheres B set by the inscribed sphere reacquiring section 57 is one.

Figure 13:
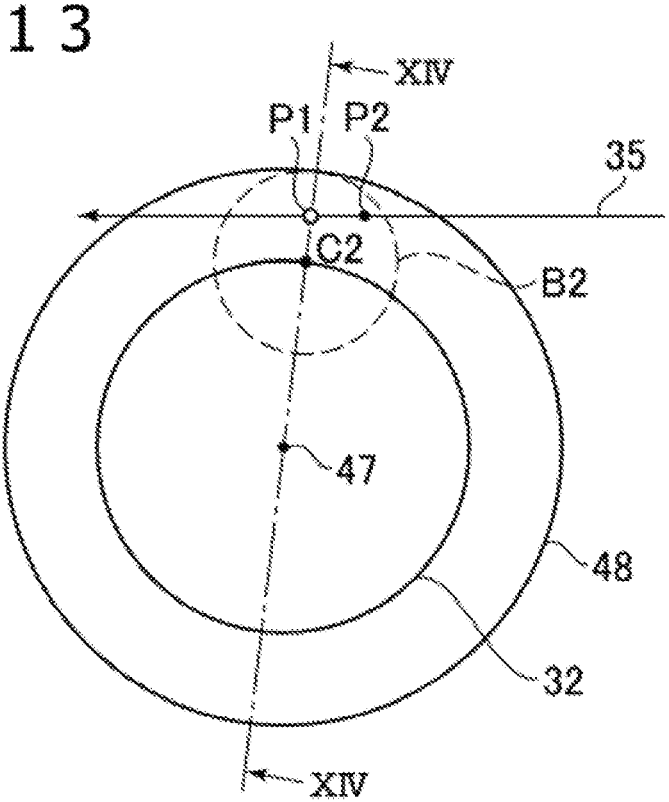
FIG. 13 is a diagram depicting one example of an intersection of the inscribed sphere and the line segment and a new inscribed sphere.
Figure 14:
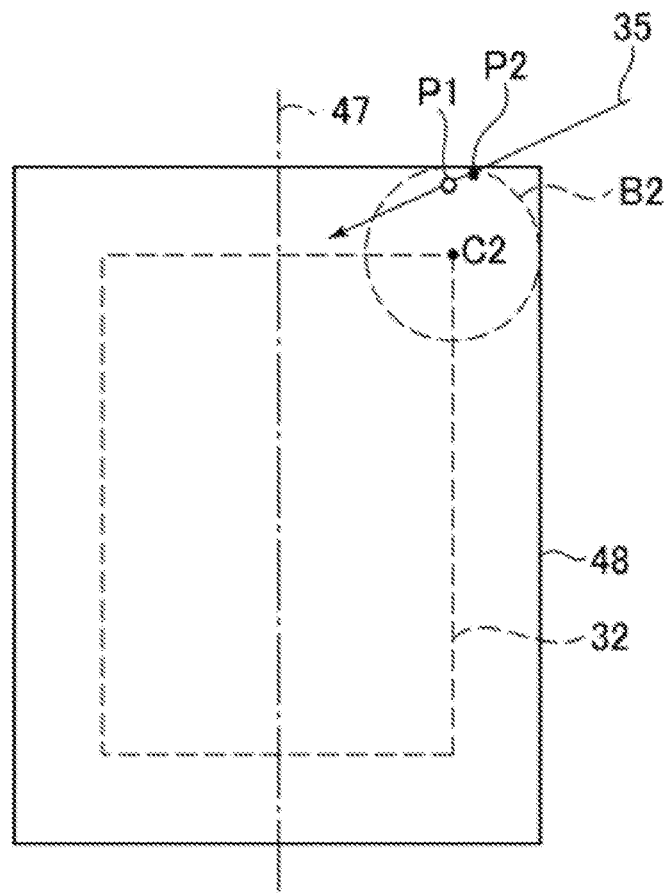
FIG. 14 is a sectional view along cutting line XIV-XIV in FIG. 13.

FIG. 13 is a diagram depicting one example of the intersection P1 and the new inscribed sphere B2. FIG. 14 is a sectional view along cutting line XIV-IV in FIG. 13. The target circular column 32 in FIGS. 13 and 14 is the same as the target circular column 32 in FIGS. 10 and 11, and the provisional circular column 48 also depicted in FIGS. 13 and 14 as with FIGS. 10 and 11. The intersection P1 is the intersection of the inscribed sphere B1 and the line segment 35 and the inscribed sphere B2 is newly set according to the intersection P1. FIG. 14 depicts the section including the central axis 47 and the intersection P1. For example, the inscribed sphere reacquiring section 57 sets the new inscribed sphere B2 in such a manner that a center C2 of the new inscribed sphere B2 is located on the flat plane including the intersect on P1 and the central axis 47 and on the circumference of the end closer to the intersection P1 in the upper end and lower end of the target circular column 32 and the new inscribed sphere B2 is inscribed in the determination torus T.

Then, the intersection recalculating section 58 calculates the intersection P of the new inscribed sphere B and the line segment 35 (step S209). The method for calculating the intersection P of the new inscribed sphere B and the line segment 35 is the same as the method of the intersection calculating section 56. For example, the intersection recalculating section 58 obtains the intersection P of the new inscribed sphere B and the line segment 35 by solving a quadratic equation derived from an expression representing the new inscribed sphere B and an expression representing the line segment 35. Furthermore, if two intersections of the new inscribed sphere B and the line segment 35 are obtained, the intersection recalculating section 58 obtains the intersection closest to the start point 33 of the line segment 35 as the intersection P that becomes the target of the subsequent processing. In FIGS. 13 and 14, an example of the intersection P2 of the inscribed sphere B2 and the line segment 35 is depicted.

If it is difficult to obtain the intersection P of the new inscribed sphere B and the line segment 35 (N of a step S210), the intersection output section 59 outputs information indicating that it is determined that the intersection of the determination torus T and the line segment 35 does not exist and the target sphere 31 does not collide with the target circular column 32, followed by proceeding to the processing of the step S103.

On the other hand, if it is possible to obtain the intersection P of the new inscribed sphere B and the line segment 35 (Y of the step S210), the intersection output section 59 determines whether a convergence condition is satisfied (step S211). The convergence condition may be that the distance between the intersection P obtained by the previous calculation and the intersection P obtained by the present calculation is shorter than a predetermined threshold, or may be that the processing from the step S208 to the step S210 is repeated a predetermined number of times. If the convergence condition is not satisfied (N of the step S211), the processing of the step S208 and the subsequent steps repeated. In the step S208 after the repetition, the inscribed sphere B is acquired by using the intersection P obtained in the step S209, of course.

Figure 15:
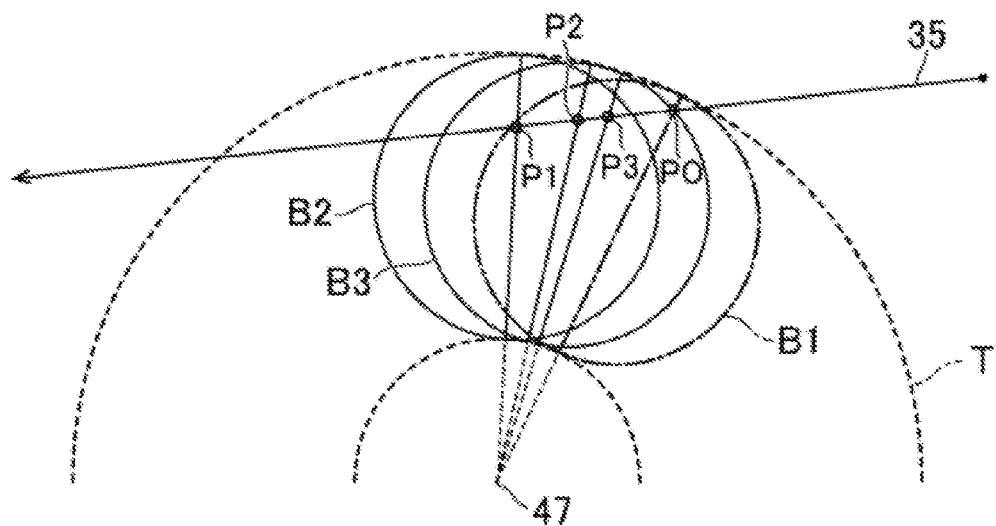
FIG. 15 is a diagram for explaining the provisional intersection and plural intersections that are sequentially acquired.

The intersection calculating section 56 and the intersection recalculating section 58 calculate the intersections P of the inscribed spheres B and the line segment 35, and the intersection P calculated as a newer intersection gets closer to the actual intersection of the determination torus T and the line segment 35. FIG. 15 is a diagram for explaining the provisional intersection P0 and plural intersections P1, P2, and P3 that are sequentially acquired. The inscribed spheres B1, B2, and B3 are acquired on the basis of the provisional intersection P0 and the intersections P1 and P2, respectively, and the intersections P1 to P3 are the intersections of the inscribed spheres B1 to P3, respectively, and the line segment 35. As depicted in FIG. 15, the distance between the certain intersection P and the intersection P obtained immediately before this certain intersection P becomes shorter as the intersection P becomes newer.

On the other hand, if the convergence condition is satisfied (Y of the step S211), the intersection output section 59 determines that the target sphere 31 collides with the target circular column 32, and outputs the intersection P obtained in the step S209 as the intersection of the determination torus T and the line segment 35 (step S212). When the position of the calculated intersection P converges, the intersection P exists on the contact circle between the determination torus T and the inscribed sphere B and thus this intersection P is the actual intersection of the determination torus T and the line segment 35. Therefore, the intersection P satisfying the convergence condition is a sufficiently-accurate approximate solution of the intersection of the expanded object 34 and the line segment 35 and is an approximate solution of the position of the center of the target sphere 31 when the target sphere 31 collides with the target circular column 32. This output intersection is used in the processing of the step S103 and the subsequent steps.

The method described thus far allows the collision processing portion 52 to obtain the intersection of a torus and a line segment without directly solving a high-order equation and also allows the amount of calculation of the collision processing portion 52 to be a realistic amount. Furthermore, the method also enables determination of collision between a sphere and circular column.

The present disclosure contains subject matter related to that disclosed in Japanese Priority Patent Application JP 2015-167197 filed in the Japan Patent Office on Aug. 26, 2015, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
One or more processor configured to:
an inscribed sphere acquiring section configured to acquire an inscribed sphere that intersects a line segment and is inscribed in a torus in calculation of an intersection of the torus and the line segment;
a calculating section configured to calculate an intersection at which the inscribed sphere intersects the line segment;
a reacquiring section configured to acquire a position of a new inscribed sphere in such a manner that a contact circle that is a contact position between the new inscribed sphere and the torus gets closer to the intersection of the torus and the line segment;
a recalculating section configured to calculate an intersection of the new inscribed sphere and the line segment; and
an intersection output section configured to output the intersection of the torus and the line segment on the basis of an intersection of the inscribed sphere and the line segment obtained by causing the recalculating section to calculate the intersection of the new inscribed sphere acquired by the reacquiring section and the line segment one time or a plurality of times.

2. The image processing device according to claim 1, wherein the inscribed sphere acquiring section acquires a plurality of inscribed spheres that include an inscribed circle intersecting the line segment and are each inscribed in the torus, and the calculating section calculates an intersection at which any of the plurality of inscribed spheres intersects the line segment.

3. The image processing device according to claim 1, acquires the inscribed sphere inscribed in the torus on the basis of an intersection of an object including the torus and the line segment.

4. The image processing device according to claim 3, further comprising:
- a provisional intersection calculating section configured to obtain an intersection of a circular column circumscribed to the torus and the line segment,
- wherein the inscribed sphere acquiring section acquires the inscribed sphere inscribed in the torus on the basis of an intersection of the circular column surrounding the torus and the line segment.

5. An image processing method comprising: acquiring an inscribed sphere that intersects a line segment and is inscribed in a torus in calculation of an intersection of the torus and the line segment;
- calculating an intersection at which the inscribed sphere intersects the line segment;
- acquiring a position of a new inscribed sphere in such a manner that a contact circle that is a contact position between the new inscribed sphere and the torus gets closer to the intersection of the torus and the line segment;
- calculating an intersection of the new inscribed sphere and the line segment; and
- outputting the intersection of the torus and the line segment on the basis of an intersection of the inscribed sphere and the line segment obtained by calculating the intersection of the new inscribed sphere acquired and the line segment one time or a plurality of times.

6. A non-transitory computer readable storage medium storing instruction when executed by a processor, performing steps comprising:
- by an inscribed sphere acquiring section, acquiring an inscribed sphere that intersects a line segment and is inscribed in a torus in calculation of an intersection of the torus and the line segment;
- by a calculating section, calculating an intersection at which the inscribed sphere intersects the line segment;
- by a reacquiring section, acquiring a position of new inscribed sphere in such a manner that a contact circle that is a contact position between the new inscribed sphere and the torus gets closer to the intersection of the torus and the line segment;
- by a recalculating section, calculating an intersection of the new inscribed sphere and the line segment; and
- by an intersection output section, outputting the intersection of the torus and the line segment on the basis of an intersection of the inscribed sphere and the line segment obtained by causing the recalculating section to calculate the intersection of the new inscribed sphere acquired by the reacquiring section and the line segment one time or a plurality of times.

* * * * *